US012712426B2

(12) United States Patent
Gong et al.

(10) Patent No.: US 12,712,426 B2
(45) Date of Patent: Aug. 18, 2026

(54) CONTROL CIRCUIT AND VOLTAGE REGULATING UNIT FOR SWITCHING POWER CONVERTER

(71) Applicant: Monolithic Power Systems, Inc., Kirkland, WA (US)

(72) Inventors: Junyong Gong, Chengdu (CN); Jian Zhang, Chengdu (CN); Ganggang Niu, Chengdu (CN); Hong Wu, Chengdu (CN)

(73) Assignee: Monolithic Power Systems, Inc., Kirkland, WA (US)

( * ) Notice: Subject to any disclaimer, the term of this patent is extended or adjusted under 35 U.S.C. 154(b) by 417 days.

(21) Appl. No.: 18/394,952

(22) Filed: Dec. 22, 2023

(65) Prior Publication Data

US 2024/0235363 A1 Jul. 11, 2024

(30) Foreign Application Priority Data

Jan. 6, 2023 (CN) ......................... 202310017329.8

(51) Int. Cl.
*H02M 1/00* (2007.01)
*H02M 1/36* (2007.01)
*H02M 3/158* (2006.01)

(52) U.S. Cl.
CPC ....... *H02M 1/0045* (2021.05); *H02M 1/0032* (2021.05); *H02M 1/36* (2013.01); *H02M 3/158* (2013.01)

(58) Field of Classification Search
CPC .... H02M 1/0045; H02M 1/0032; H02M 1/36; H02M 3/158
See application file for complete search history.

(56) References Cited

U.S. PATENT DOCUMENTS

2016/0079852 A1* 3/2016 Lai ........................ H02M 3/156 323/271
2018/0129234 A1* 5/2018 Melgar ............... H02M 3/1588
2024/0120824 A1* 4/2024 Ju ............................. G05F 1/56
2025/0224792 A1* 7/2025 Jiang ......................... G06F 1/26

* cited by examiner

*Primary Examiner* — Rafael O De Leon Domenech
(74) *Attorney, Agent, or Firm* — Ashurst Perkins Coie US LLP

(57) ABSTRACT

A control circuit for a switching power converter is disclosed herein. The control circuit includes a power input terminal, a switching step-down regulator module, and a low dropout linear regulator module. The power input terminal is configured to receive an input signal. The switching step-down regulator module has a step-down regulating input terminal and a step-down output terminal. The step-down regulating input terminal is coupled to the power input terminal, and the switching step-down regulator module is configured to provide a step-down output voltage at the step-down output terminal. The low dropout linear regulator module is coupled to the power input terminal and the step-down output terminal, and is configured to be powered by the power input terminal in a first operation period and be powered by the step-down output voltage in a second operation period.

26 Claims, 3 Drawing Sheets

CONTROL CIRCUIT AND VOLTAGE REGULATING UNIT FOR SWITCHING POWER CONVERTER

CROSS-REFERENCE TO RELATED APPLICATIONS

This application claims priority to and the benefit of Chinese patent application 202310017329.8, filed on Jan. 6, 2023, which is incorporated herein by reference in its entirety.

TECHNICAL FIELD

The present invention relates to a switching power converter. More particularly, the present invention relates to a control circuit of a switching power converter and a voltage regulating unit of the control circuit.

BACKGROUND OF THE INVENTION

For DC-to-DC switching power converters that need to support wide input and output voltage range applications, power loss and heat dissipation require particular attention in system design. In addition, how to power the low-voltage modules in the switching power converter (e.g., comparator, operational amplifier, logic control module, etc.) to ensure that these modules can operate normally is a problem to be addressed as well. For example, in the application scenario of Universal Serial Bus ("USB") Power Delivery ("PD") 3.1 Extended Power Range ("EPR"), the maximum output power is increased to 240 W, and the DC-to-DC switching power converter needs to support 48V output voltage and 5 A output current. Such application scenario brings challenges to how to reduce power loss and improve heat dissipation for the DC-to-DC switching power converter and how to provide supply voltage for its internal low-voltage modules.

SUMMARY OF THE INVENTION

According to an embodiment of the present invention, a control circuit for a switching power converter is provided. The control circuit includes a power input terminal, a switching step-down regulator module, and a low dropout linear regulator module. The power input terminal is configured to receive an input signal. The switching step-down regulator module has a step-down regulating input terminal and a step-down output terminal. The step-down regulating input terminal is coupled to the power input terminal, and the switching step-down regulator module is configured to provide a step-down output voltage at the step-down output terminal. The low dropout linear regulator module is coupled to the power input terminal and the step-down output terminal, and is configured to be powered by the power input terminal in a first operation period and be powered by the step-down output voltage in a second operation period.

According to another embodiment of the present invention, a control circuit for a switching power converter is provided. The control circuit includes a power input terminal, a switching step-down regulator module, and a low dropout linear regulator module. The power input terminal is configured to receive an input signal. The switching step-down regulator module has a step-down regulating input terminal and a step-down output terminal. The step-down regulating input terminal is coupled to the power input terminal, and the switching step-down regulator module is configured to provide a step-down output voltage at the step-down output terminal. The low dropout linear regulator module is coupled to the power input terminal and the step-down output terminal, and is configured to draw power from the power input terminal when the step-down output voltage is lower than a set threshold voltage and draw power from the step-down output terminal when the step-down output voltage reaches the set threshold voltage.

BRIEF DESCRIPTION OF THE DRAWINGS

The present invention can be further understood with reference to following detailed description and appended drawings, wherein like elements are provided with like reference numerals. These drawings are only for illustration purpose, thus may only show part of the devices and are not necessarily drawn to scale.

DETAILED DESCRIPTION

Various embodiments of the present invention will now be described. In the following description, some specific details, such as example circuits and example values for circuit components, are included to provide a thorough understanding of the embodiments. One skilled in the relevant art will recognize, however, that the present invention can be practiced without one or more specific details, or with other methods, components, materials, etc.

Throughout this description, the phrases "in one embodiment", "in an embodiment", "in some embodiments", "in an example", "in some examples", "in one implementation", and "in some implementations" are used to include both combinations and sub-combinations of various features described herein as well as variations and modifications thereof. The phrase "in one embodiment," as used herein does not necessarily refer to the same embodiment, although it may Throughout the specification and claims, the term "coupled," as used herein, is defined as directly or indirectly connected in an electrical or non-electrical manner. The terms "a," "an," and "the" include plural reference, and the term "in" includes "in" and "on". The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
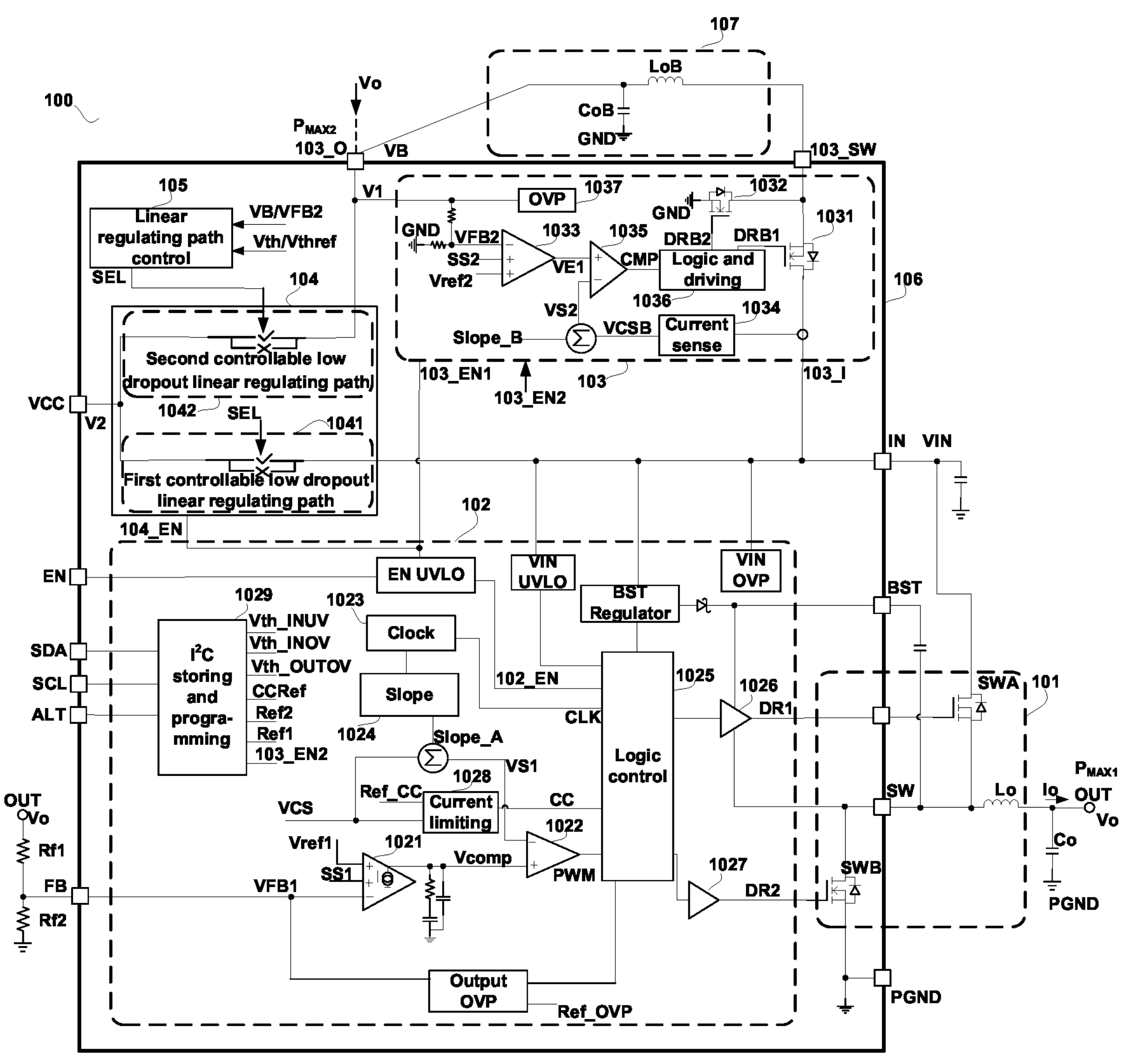
FIG. 1 is a circuit diagram of a switching power converter 100 in accordance with an exemplary embodiment of the present invention.

FIG. 1 is a circuit diagram of a switching power converter 100 in accordance with an exemplary embodiment of the present invention. The switching power converter 100 may include a power input terminal IN, a power output terminal OUT, a power stage switching unit 101, and/or a control unit 102. The power input terminal IN is configured to receive an input signal, e.g., an input voltage VIN. The power output terminal OUT is configured to provide an adequate output voltage Vo, in order to provide power and an output current Io to a load. The power stage switching unit 101 is configured to adjust a power transmitted from the power input terminal IN to the load (or to the power output terminal OUT) in response to control signals (e.g., control signals DR1 and DR2 as illustrated in FIG. 1). The control unit 102 is configured to provide the control signals to the power stage switching unit 101 based on the information that reflects the input voltage VIN, the output voltage Vo, the output current Co, etc. According to one exemplary embodiment of the present invention, the switching power converter 100 is configured to provide a first maximum output power $P_{MAX1}$.

According to one exemplary embodiment of the present invention, the switching power converter 100 is configured to operate in a wide input voltage range, for example, from 4V to 100V. That is, the switching power converter 100 may support applications where the input voltage VIN changes in the range from 4V to 100V. The switching power converter 100 is further configured to provide a wide output voltage range, for example, from 1V to 100V. That is, the switching power converter 100 may support applications where the output voltage Vo changes in the range from 1V to 100V.

According to one exemplary embodiment of the present invention, the power stage switching unit 101 may adopt any DC-to-DC or DC-to-AC power converter topology, e.g., isolated or non-isolated, synchronous or asynchronous switching power converter topology.

According to one exemplary embodiment of the present invention, the switching power converter 100 is configured to charge or discharge an inductive energy storage component (e.g., an input inductor Lo as illustrated in FIG. 1) based on control signals (e.g., the control signals DR1 and DR2 as illustrated in FIG. 1), so that the input voltage VIN is converted to the output voltage Vo. In the example of FIG. 1, the power stage switching unit 101 may include a first power switch SWA and a second power switch SWB that are coupled between the power input terminal IN and a power reference ground PGND. The first power switch SWA and the second power switch SWB share a common connection terminal SW. The common connection terminal SW may be coupled to the power output terminal OUT through, for example, the inductive energy storage component Lo. Accordingly, in the example of FIG. 1, the power stage switching unit 101 is configured to be a step-down power converter topology, and the switching power converter 100 may be referred to as a step-down switching power converter. According to one exemplary embodiment of the present invention, the switching power converter 100 may further include an output filtering unit, e.g., a capacitive energy storage component Co. One terminal of the capacitive energy storage component Co is coupled to the power output terminal OUT, and the other terminal of the capacitive energy storage component Co is coupled to the power reference ground PGND. The capacitive energy storage component Co is configured to filter the switching output of the power stage switching unit 101 (or, the output voltage Vo), so that the power output terminal OUT may provide the smooth output voltage Vo.

According to one exemplary embodiment of the present invention, the switching power converter 100 may further include a feedback circuit that is configured to detect the output voltage Vo and provide a feedback signal VFB1 that is indicative of the output voltage Vo. For example, the feedback circuit as illustrated in FIG. 1 includes a first feedback resistor Rf1 and a second feedback resistor Rf2 that are coupled in series between the power output terminal OUT and the power reference ground PGND. The feedback signal VFB1 is provided at the common node of the first feedback resistor Rf1 and the second feedback resistor Rf2. In another embodiment, other suitable feedback circuit may be adopted. In yet another embodiment, the switching power converter 100 may not include a feedback circuit, and the output voltage Vo is directly fed back to provide the feedback signal VFB1.

According to one exemplary embodiment of the present invention, the control unit 102 may include an adjusting operation circuit 1021 (including, for example, an operational amplifier that is exemplarily illustrated in FIG. 1) that is configured to perform operation to reference signal(s) (including, for example, a soft switching reference signal SS1 and an after-switching steady-state reference signal Vref1 of the switching power converter 100) and the feedback signal VFB1 that is indicative of the output voltage Vo, to provide a regulating signal Vcomp that carries the information of the difference between the feedback signal VFB1 and the reference signal(s). During the soft switching of the switching power converter 100, the regulating signal Vcomp may represent an amplified difference signal that is indicative of the difference between the feedback signal VFB1 and the soft-switching reference signal SS1, and the soft-switching reference signal SS1 may be a voltage signal that gradually increases from the reference ground voltage. After the soft switching of the switching power converter 100 ends (that is, after the switching power converter 100 enters into a steady-state operation), the regulating signal Vcomp may represent an amplified difference signal that is indicative of the difference between the feedback signal VFB1 and the steady-state reference signal Vref1. The steady-state reference signal Vref1 may be a constant value that is indicative of a steady voltage value of the output voltage Vo after the switching power converter 100 enters into the steady-state operation. The control circuit 102 may further include a comparison circuit 1022 that is configured to compare a compensated current sample signal VS1 and the regulating signal Vcomp to provide a pulse width modulation signal PWM. The compensated current sample signal VS1 is indicative of a current flowing through the power stage switching unit 101 (for example, a switching current flowing through the first power switch SWA or the second power switch SWB, or an inductor current flowing through the inductive energy storage component Lo) or is indicative of the current sample signal VCS of the output current Io after slope compensation. The control unit 102 may further include a clock generation circuit 1023 that is configured to generate a clock signal CLK and a slope signal generation circuit 1024 that is configured to generate a slope compensation signal Slope_A based on the clock signal CLK. The slope compensation signal Slope_A may be configured to perform slope compensation to the current sample signal VCS in order to provide the compensated current sample signal VS1. The control unit 102 may further include a logic control circuit 1025, a first driving circuit 1026, and a second driving circuit 1027 that are configured to generate the first control signal DR1 and the second control signal DR2 based on at least the clock signal CLK and the pulse width modulation PWM, in order to control the first power switch SWA and the second power switch SWB respectively. A bootstrap regulating circuit BST Regulator may be coupled to a BST terminal of the switching power converter 100. In actual applications, a capacitor may be coupled between the BST terminal and the common connection terminal SW. It should be understood by persons skilled in the art that the first driving circuit 1026 and the second driving circuit 1027 may be integrated or included in the logic control circuit 1025 and thus not necessarily illustrated independently as shown in FIG. 1.

In the example of FIG. 1, the control unit 102 is illustrated as adopting a peak current control mode. It should be understood by persons skilled in the art that, in various embodiments, the control unit 102 may include a control circuit that adopts, for example, a constant on-time control mode, a constant off-time control mode, an adaptive on-time control mode, an adaptive off-time control mode, an average current control mode, or other suitable control modes, as long as the control unit 102 may achieve the control of the switching power converter 100 (that is, as long as the control unit 102 may switch on and off the power stage switching unit 101 (including, for example, the first power switch SWA and the second power switch SWB) to convert the signal received at the power input terminal IN (e.g., the input voltage VIN) to the output voltage Vo). The present invention does not limit the control mode and the circuit of the control unit 102.

According to one exemplary embodiment of the present invention, the switching power converter 100 may further include a switching step-down regulator module 103. The switching step-down regulator module 103 may have a step-down regulating input terminal 103_I and a step-down output terminal 103_O. The step-down regulating input terminal 103_I may be coupled to the power input terminal IN, and the switching step-down regulator module 103 may be configured to provide a step-down output voltage VB at the step-down output terminal 103_O based on the input signal (e.g. the input voltage VIN). In one embodiment, a steady-state reference voltage value of the step-down output voltage VB is a first set voltage V1. In one embodiment, the first set voltage V1 may be set to be between 3.8V to 5.5V. In one embodiment, the first set voltage V1 may be set to be 5V. In another embodiment, the first set voltage V1 may be set to be 4.5V. It should be understood by persons skilled in the art that the value of the first set voltage V1 described here is merely exemplary and does not limit the present invention. The first set voltage V1 may be set according to actual applications and design needs. In one exemplary embodiment, the switching step-down regulator module 103 is configured to provide a second maximum output power $P_{MAX2}$, and the second maximum output power $P_{MAX2}$ is much less than the first maximum output power $P_{MAX1}$, i.e., $P_{MAX2} \ll P_{MAX1}$. For example, in one embodiment, the ratio of the second maximum output power $P_{MAX2}$ to the first maximum output power $P_{MAX1}$ (i.e., $P_{MAX2}/P_{MAX1}$) may be set in the range from 1‰ to 5‰. Below provides a specific example to help better understanding. In one example, the switching power converter 100 may provide 100V maximum output voltage and 10 A maximum output current. The switching step-down regulator module 103 may provide 500 mA maximum output current, and the steady-state reference value (i.e., the first set voltage V1) of its step-down output voltage VB is 5V. In this example, the first maximum output power $P_{MAX1}$ that the switching power converter 100 may provide is 1000 W, the second maximum output power $P_{MAX2}$ that the switching step-down regulator module 103 may provide is 2.5 W, and $P_{MAX2}/P_{MAX1}$=2.5 W/1000 W=2.5‰.

According to one exemplary embodiment of the present invention, still with reference to FIG. 1, the switching step-down regulator module 103 may include a first step-down switch 1031 and a second step-down switch 1032 that are coupled between the step-down regulating input terminal 103_I and the reference ground GND, and the first step-down switch 1031 and the second step-down switch 1032 share a common connection terminal 103_SW. The switching step-down regulator module 103 may further include a step-down switch control circuit that is configured to provide a first step-down switch control signal DRB1 and a second step-down switch control signal DRB2 respectively to a control terminal of the first step-down switch 1031 and a control terminal of the second step-down switch 1032. The step-down switch control circuit may be configured to generate the first step-down switch control signal DRB1 and the second step-down switch control signal DRB2 based on a voltage (e.g., a sample voltage (or, a feedback voltage) VFB2) that reflects the information of the step-down output voltage VB, a signal (e.g., the current sample signal VCSB) that reflects the information of the current flowing through the first step-down switch 1031 or the second step-down switch 1032, and the reference signal Vref2 that reflects the steady-state reference voltage value of the step-down output voltage VB (i.e., the first set voltage V1).

The switching step-down regulator module 103 may be configured to charge or discharge an inductive energy storage component (e.g., a step-down output inductor LoB as illustrated in FIG. 1) by switching on and off the first step-down switch 1031 and the second step-down switch 1032, so that the input voltage VIN is converted to the step-down output voltage VB. In the example of FIG. 1, the common connection terminal 103_SW of the first step-down switch 1031 and the second step-down switch 1032 may be coupled to the step-down output terminal 103_O through, for example, the inductive energy storage component LoB. According to one exemplary embodiment of the present invention, a capacitive energy storage component CoB may also be coupled between the step-down output terminal 103_O and the reference ground GND and be configured to filter the step-down output voltage VB. In the example of FIG. 1, the inductive energy storage component LoB (e.g., the step-down output inductor as illustrated in FIG. 1) and the capacitive energy storage component CoB are illustrated as an energy storage unit 107.

According to one exemplary embodiment of the present invention, still with reference to FIG. 1, the step-down switch control circuit may include a first operational amplifier 1033. The first operational amplifier 1033 is configured to perform operation to the sample voltage VFB2 and a reference signal (including, for example, a soft switching reference signal SS2 and an after-switching steady-state reference signal Vref2 of the switching step-down regulator module 103), to provide a first operational amplifying output signal VE1. During the soft switching of the switching step-down regulator module 103, the first operational amplifying output signal VE1 may represent an amplified difference signal that is indicative of the difference between the sample voltage VFB2 and the soft-switching reference signal SS2, and the soft-switching reference signal SS2 may be a voltage signal that gradually increases from the reference ground voltage. After the soft switching of the switching step-down regulator module 103 ends (that is, after the switching step-down regulator module 103 enters into the steady-state operation), the first operational amplifying output signal VE1 may represent an amplified difference signal that is indicative of the difference between the sample voltage VFB2 and the steady-state reference signal Vref2. The steady-state reference signal Vref2 may be a constant value that is indicative of a steady voltage value of the step-down output voltage VB after the switching step-down regulator module 103 enters into the steady-state operation. The step-down switch control circuit may further include a current sense circuit 1034 that is configured to sample a current flowing through the first step-down switch 1031 or the second step-down switch 1032 to provide a current sense signal VCSB. A slope compensation signal Slope_B may be used to perform slope compensation to the current sense signal VCSB to provide a compensated current sense signal VS2. The slope compensation signal Slope_B may be provided by the slope signal generation circuit 1024 of the control unit 102. The step-down switch control circuit may further include a comparison circuit 1035 that is configured to compare the compensated current sense signal VS2 and the first operational amplifying output signal VE1 to provide a comparison output signal CMP. The step-down switch control circuit may further include a logic and driving circuit 1036 that is configured to generate the first step-down switch control signal DRB1 and the second step-down switch control signal DRB2 based on at least the comparison output signal CMP. The step-down switch control circuit may further include an over-voltage protection circuit 1037 that is configured to, for example, determine whether the step-down output voltage VB is over-voltage based on the sample voltage VFB2 that is indicative of the step-down output voltage VB.

In the example of FIG. 1, the step-down switch control circuit is illustrated as adopting the peak current control mode. It should be understood by persons skilled in the art that, in various embodiments, the step-down switch control circuit may include a control circuit that adopts, for example, the constant on-time control mode, the constant off-time control mode, the adaptive on-time control mode, the adaptive off-time control mode, the average current control mode, or other suitable control modes, as long as the step-down switch control circuit may achieve the control of the switching step-down regulator module 103 (that is, as long as the step-down switch control circuit may switch on and off the first step-down switch 1031 and the second step-down switch 1032 to convert the signal received at the step-down regulating input terminal 103_I (e.g., the input signal received at the power input terminal IN) to the step-down output voltage VB). The present invention does not limit the control mode and the circuit of the step-down switch control circuit.

Figure 2:
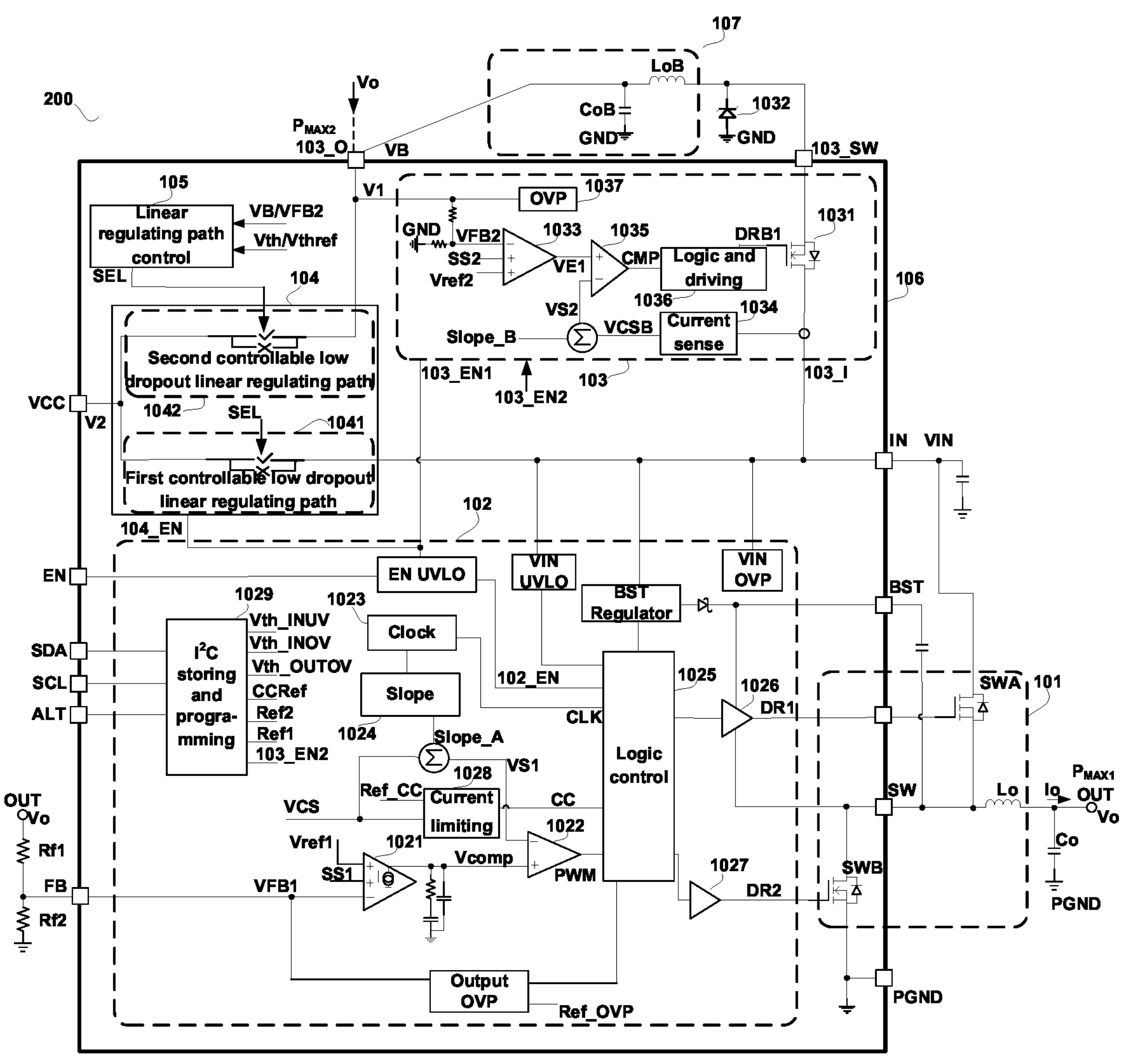
FIG. 2 is a circuit diagram of a switching power converter 200 in accordance with another exemplary embodiment of the present invention.

In the example of FIG. 1, the first step-down switch 1031 and the second step-down switch 1032 are illustrated as including controllable field effect transistors, e.g., metal-oxide-semiconductor field effect transistor ("MOSFET"), respectively. It should be understood by persons skilled in the art that the second step-down switch 1032 may be replaced by a unidirectional conducting device, such as a diode or a Schottky diode, as illustrated in the example of FIG. 2. FIG. 2 is a circuit diagram of a switching power converter 200 in accordance with another exemplary embodiment of the present invention. With reference to FIGS. 1 & 2, the difference between the switching power converter 100 and the switching power converter 200 is that the step-down switch control circuit in the switching power converter 200 does not have to provide the step-down control signal DRB2. Except for such difference, previous descriptions of the switching power converter 100 in FIG. 1 are applicable to the switching power converter 200 in FIG. 2.

According to one exemplary embodiment of the present invention, still with reference to FIG. 1, the switching power converter 100 may further include a low dropout linear regulator module 104 that is coupled to the power input terminal IN and the step-down output terminal 103_O. The low dropout linear regulator module 104 may be configured to draw power from the power input terminal IN (for example, be powered by the input signal) during a first operation period $t_{SS}$, in order to provide or generate a second set voltage V2 at a linear regulating output terminal VCC. In one example, with reference to FIG. 4, the power input terminal IN (or the input voltage VIN) may be coupled to the low dropout linear regulator module 104 through a unidirectional conducting device Din (e.g., a diode or a Schottky diode), and the unidirectional conducting device Din is configured to be conducted only in a direction from the power input terminal IN to the low dropout linear regulator module 104. In one embodiment, the second set voltage V2 may be configured to, during the first operation period $t_{SS}$, provide a supply voltage that the control unit 102 or the module(s) and the component(s) included in the control unit 102 require in order to operate normally. The second set voltage V2 may also be configured to, during the first operation period $t_{SS}$, provide a supply voltage that the circuit(s) (e.g., the step-down switch control circuit) and the component(s) included in the switching step-down regulator module 103 require in order to operate normally. The second set voltage V2 is lower than the first set voltage V1, i.e., V2<V1. In one embodiment, the second set voltage V2 has a value that is between 2.8V to 3.6V. In one embodiment, the second set voltage V2 is set to be 3.3V. In another embodiment, the second set voltage V2 is set to be 3.6V. It should be understood by persons skilled in the art that the value of the second set voltage V2 described here is merely exemplary and does not limit the present invention. The second set voltage V2 may be set according to actual applications and design needs, as long as it may provide power that the control unit 102 (or the module(s) and the component(s) included in the control unit 102) and the step-down switch control circuit (or the module(s) and the component(s) included in the step-down switch control circuit) require in order to operate normally.

According to one exemplary embodiment of the present invention, the low dropout linear regulator 104 may be further configured to, during a second operation period $t_{SD}$, switch to be powered by (or draw power from) the step-down output voltage VB generated by the switching step-down regulator module 103 (the steady-state reference voltage value of the step-down output voltage VB is, for example, the first set voltage V1). Accordingly, during the second operation period $t_{SD}$, the low dropout linear regulator 104 may achieve the most optimized voltage conversion efficiency and reduce power consumption and heat generated during its operation. According to one exemplary embodiment of the present invention, the second operation period $t_{SD}$ may refer to any time period that is after the first operation period $t_{SS}$. For example, in one embodiment, the first operation period $t_{SS}$ may refer to a time period that the step-down output voltage VB of the switching step-down regulator module 103 rises from the reference ground voltage (e.g., 0V) to the set threshold voltage Vth. In this example, the second operation period $t_{SD}$ may be any time period that is after the step-down output voltage VB of the switching step-down regulator module 103 rises to the set threshold voltage Vth. According to one exemplary embodiment of the present invention, the set threshold voltage Vth may be appropriately set according to actual applications and design needs. For example, in one embodiment, the set threshold voltage Vth may be set to be higher than the second set voltage V2 but not higher than the first set voltage V1. That is, V2<Vth≤V1. In another example, the set threshold voltage Vth may be set to be higher than the second set voltage V2 by a set voltage amplitude ΔV. That is, Vth=V2+ΔV. The set voltage amplitude ΔV may be set according to operating parameters of regulating transistors in the low dropout linear regulator module 104. The regulating transistors are configured for linear regulation. In one example, the set voltage amplitude ΔV may be in the range of 0.3V-0.8V. In another example, the set voltage amplitude Δ V may be in the range of 0.3V-0.5V.

In another embodiment, the first operation period $t_{SS}$ may refer to the switching process (or the switching time or switching period) of the switching power converter 100. Typically, in actual applications, if the switching power converter 100 is just switched on, enabled, or powered on, or starts to receive the input power supply (e.g., the input voltage VIN), it needs to build up the supply voltage (e.g., the second set voltage V2) that the internal modules require to operate normally, various reference voltages and/or reference currents, etc. step by step during the switching process. Further, in some embodiments, the switching process may further include a time period that the output voltage Vo of the switching power converter 100 gradually rises from the reference ground voltage level (e.g., 0V) to the set output voltage value until the switching power converter 100 may stably adjust the output voltage Vo to substantially maintain it at the set output voltage value (that is, until the switching power converter 100 enters into the steady-state operation). The second operation period $t_{SD}$ may refer to any operation period that is after the switching process of the switching power converter 100, for example, the steady-state operation period after the output voltage Vo rises to the set output voltage value, or a time period within that steady-state operation period.

For the switching power converter 100 that adopts various embodiments of the present invention, in the application scenario where the input voltage VIN is higher than the steady-state reference voltage value of the step-down output voltage VB (i.e., the first set voltage V1) of the switching step-down regulator module 103 (this is the most common scenario in actual applications), or in the application scenario where both the input voltage VIN and the output voltage Vo (here, the output voltage Vo refers to the set output voltage value that the output voltage Vo of the switching power converter 100 is adjusted to after the switching power converter 100 enters into the steady-state operation period) are higher than the steady-state reference voltage value of the step-down output voltage VB, the low dropout linear regulator module 104 will switch to be powered by the step-down output voltage VB (which is equal to the first set voltage V1 in steady state) of the switching step-down regulator module 103. Compared with the first operation period $t_{SS}$ when the low dropout linear regulator module 104 is powered by the input voltage VIN or the output voltage Vo and the input voltage VIN has to be adjusted to the second set voltage V2, in the second operation period $t_{SD}$, the power consumption and heat generated when the first set voltage V1 that is lower than the input voltage VIN or the output voltage Vo is adjusted to the second set voltage V2 is reduced significantly. In addition, because the switching step-down regulator module 103 typically has a higher voltage conversion efficiency (e.g., higher than 85%) and a lower power consumption, the overall system efficiency in the application scenario where the input voltage VIN is higher than the first set voltage V1 (or both the input voltage VIN and the output voltage Vo are higher than the first set voltage V1) can be improved, and the power consumption and generated heat can be reduced.

Below provides a specific example in order to better understand the present invention. In one example, the application scenario requires that, for the switching power converter 100, VIN=48V and Vo=20V, the first set voltage V1 is set to be 5V, the second set voltage V2 is set to be 3.3V, and the operating/output current of the low dropout linear regulator module 104 is around 0.03 A. Then, in the first operation period $t_{SS}$ (e.g., the period when the step-down output voltage VB is lower than the first set voltage V1, or the switching process or switching period of the switching power converter 100), the low dropout linear regulator module 104 draws power from the power input terminal IN (for example, the low dropout linear regulator module 104 is powered by the input voltage VIN) and needs to adjust the 48V input voltage VIN to the 3.3V second set voltage V2, and the power consumption of the low dropout linear regulator module 104 is around (48V−3.3V)*0.03 A=1.341 W. In the second operation period $t_{SD}$ (e.g., any operation period after the step-down output voltage VB reaches the first set voltage V1, or the steady-state operation period after the switching process of the switching power converter 100 is over and the output voltage Vo rises to 20V), the low dropout linear regulator module 104 switches to draw power from the step-down output terminal 103_O (for example, the low dropout linear regulator module 104 is powered by the step-down output voltage VB or the first set voltage V1). During this period, the 5V first set voltage V1 will be adjusted to the 3.3V second set voltage V2, and the power consumption of the low dropout linear regulator module 104 is around (5V−3.3V)*0.03 A=0.051 W. Accordingly, compared with the 1.341 W power consumption generated during the first operation period $t_{SS}$, the 0.051 W power consumption generated during the second operation period $t_{SD}$ is significantly reduced (by around 96.1%), and the heat generated correspondingly is greatly reduced as well. The overall system efficiency of the switching power converter 100 is improved, power consumption is reduced, and the heat dissipation problem is mitigated.

According to one exemplary embodiment of the present invention, still with reference to FIG. 1, the low dropout linear regulator module 104 may include a first controllable low dropout linear regulating path 1041 that forms between the power input terminal IN and the linear regulating output terminal VCC and a second controllable low dropout linear regulating path 1042 that forms between the step-down output terminal 103_O and the linear regulating output terminal VCC. In one example, with reference to FIG. 4, the power input terminal IN may be coupled to the first controllable low dropout linear regulating path 1041 through the unidirectional conducting device Din. The low dropout linear regulator module 104 may be configured to enable (or activate) the second controllable low dropout linear regulating path 1042 when the step-down output voltage VB reaches the set threshold voltage Vth, so that the low dropout linear regulator module 104 draws power from the step-down output terminal 103_O (for example, from the step-down output voltage VB that is generated at the step-down output terminal 103_O) through the second controllable low dropout linear regulating path 1042, to provide to the linear regulating output terminal VCC a voltage (e.g., the second set voltage V2 or other set voltage that meets the application needs) to which the second controllable low dropout linear regulating path 1042 has performed low dropout linear step-down regulation. According to one exemplary embodiment of the present invention, the low dropout linear regulator module 104 may be further configured to enable (or activate) the first controllable low dropout linear regulating path 1041 when the step-down output voltage VB is lower than the set threshold voltage Vth, so that the low dropout linear regulator module 104 draws power from the power input terminal IN (for example, from the input signal received by the power input terminal IN, such as the input voltage VIN) through the first controllable low dropout linear regulating path 1041, to provide to the linear regulating output terminal VCC a voltage (e.g., the second set voltage V2) to which the first controllable low dropout linear regulating path 1041 has performed low dropout linear step-down regulation. In the example of FIG. 1, the enablement (or activation) of the first controllable low dropout linear regulating path 1041 and the second controllable low dropout linear regulating path 1042 is illustrated as "√", and the disablement (or deactivation) of the first controllable low dropout linear regulating path 1041 and the second controllable low dropout linear regulating path 1042 is illustrated as "×".

According to the embodiments of the present invention, a switching power converter 100, a control circuit for the switching power converter 100, and a voltage regulating unit for the switching power converter 100 or its control circuit are provided. The voltage regulating unit may include the switching step-down regulator module 103 and the low dropout linear regulator 104. The switching step-down regulator module 103 and the low dropout linear regulator 104 cooperate to provide the supply voltage (e.g., the second set voltage V2) that the switching power converter 100 or the units, modules, or component(s) included in the control circuit of the switching power converter 100 require in order to operate normally.

According to one exemplary embodiment of the present invention, the switching power converter 100 (or, the voltage regulating unit of its control circuit) may further include a linear regulating path control module 105 that is configured to control or regulate a path from which the low dropout linear regulator module 104 draws power. With reference to the example of FIG. 1, the linear regulating path control module 105 may be coupled to the step-down output terminal 103_O of the switching step-down regulator module 103 and the low dropout linear regulator module 104 and may be configured to compare the step-down output voltage VB at the step-down output terminal 103_O of the switching step-down regulator module 103 and the set threshold voltage Vth, or compare the sample voltage (or, the feedback voltage) VFB2 that is indicative of the step-down output voltage VB and a threshold reference voltage Vthref that is indicative of the set threshold voltage Vth, to provide the linear regulating path control signal SEL.

In one embodiment, the linear regulating path control module 105 may be further configured to enable (or activate) the first controllable low dropout linear regulating path 1041, for example, through the linear regulating path control signal SEL when the step-down output voltage VB of the switching step-down regulator module 103 is lower than the set threshold voltage Vth (or when the sample voltage VFB2 is lower than the threshold reference voltage Vthref), so that the first controllable low dropout linear regulating path 1041 starts to operate or conduct, and thus the low dropout linear regulator module 104 may draw power from the power input terminal IN (for example, from the input signal received by the power input terminal IN, such as the input voltage VIN) through the first controllable low dropout linear regulating path 1041, to perform low dropout linear regulation and then provide the supply voltage (e.g., the second set voltage V2) that the switching power converter 100 or the units, modules, or component(s) included in the switching power converter 100 require in order to operate normally. In one embodiment, the linear regulating path control module 105 may be further configured to disable (or deactivate) the second controllable low dropout linear regulating path 1042, for example, through the linear regulating path control signal SEL when the step-down output voltage VB of the switching step-down regulator module 103 is lower than the set threshold voltage Vth (or when the sample voltage VFB2 is lower than the threshold reference voltage Vthref), so that the second controllable low dropout linear regulating path 1042 stops to operate or conduct. Accordingly, it may be understood by persons skilled in the art that the linear regulating path control module 105 may be configured to control the low dropout linear regulator module 104 to switch from drawing power from the step-down output terminal 103_O through the second controllable low dropout linear regulating path 1042 to drawing power from the power input terminal IN through the first controllable low dropout linear regulating path 1041 when the step-down output voltage VB of the switching step-down regulator module 103 is lower than the set threshold voltage Vth (or when the sample voltage VFB2 is lower than the threshold reference voltage Vthref). In this example, the period when the step-down output voltage VB is lower than the set threshold voltage Vth (or when the sample voltage VFB2 is lower than the threshold reference voltage Vthref) may be understood as the first operation period $t_{SS}$.

In one embodiment, the linear regulating path control module 105 may be further configured to enable (or activate) the second controllable low dropout linear regulating path 1042, for example, through the linear regulating path control signal SEL when the step-down output voltage VB of the switching step-down regulator module 103 reaches the set threshold voltage Vth (or when the sample voltage VFB2 reaches the threshold reference voltage Vthref), so that the second controllable low dropout linear regulating path 1042 starts to operate or conduct, and thus the low dropout linear regulator module 104 may draw power from the step-down output terminal 103_O (for example, from the step-down output voltage VB generated at the step-down output terminal 103_O) through the second controllable low dropout linear regulating path 1042, to perform low dropout linear regulation and then provide to the linear regulating output terminal VCC the supply voltage (e.g., the second set voltage V2) that the units, modules, or component(s) included in the switching power converter 100 require in order to operate normally. In one embodiment, the linear regulating path control module 105 may be further configured to disable (or deactivate) the first controllable low dropout linear regulating path 1041, for example, through the linear regulating path control signal SEL when the step-down output voltage VB of the switching step-down regulator module 103 reaches the set threshold voltage Vth (or when the sample voltage VFB2 reaches the threshold reference voltage Vthref), so that the first controllable low dropout linear regulating path 1041 stops to operate or conduct. Accordingly, it may be understood by persons skilled in the art that the linear regulating path control module 105 may be configured to control the low dropout linear regulator module 104 to switch from drawing power from the power input terminal IN through the first controllable low dropout linear regulating path 1041 to drawing power from the step-down output terminal 103_O through the second controllable low dropout linear regulating path 1042 when the step-down output voltage VB of the switching step-down regulator module 103 reaches the set threshold voltage Vth (or when the sample voltage VFB2 reaches the threshold reference voltage Vthref). In this example, any period after the step-down output voltage VB reaches the set threshold voltage Vth (or after the sample voltage VFB2 reaches the threshold reference voltage Vthref) may be understood as the second operation period $t_{SD}$.

According to one embodiment of the present invention, the control unit 102, the switching step-down regulator module 103, the low dropout linear regulator module 104, and the linear regulating path control module 105 may be integrated on the same die and be packaged in a same chip 106 as the control circuit of the switching power converter 100. According to one embodiment of the present invention, one or more power switch (e.g., the first power switch SWA and/or the second power switch SWB) of the power stage switching unit 101 may be integrated on the same die (or on a different die) with the control unit 102 or be packaged in the same chip 106. According to one embodiment of the present invention, the switching step-down regulator module 103 may be independently integrated on a die or packaged in a chip, and not be integrated on the same die or packaged in the same chip with the control unit 102, the low dropout linear regulator module 104, and the linear regulating path control module 105.

According to one embodiment of the present invention, the control unit 102 may further include one or more protection circuits that are configured to achieve protection function. For example, the control unit 102 may further include a current limiting circuit 1028 that is configured to compare the current sample signal VCS and a current limiting threshold Ref_CC to provide a current limiting control signal CC. The logic control circuit 1025 may be configured to control the first power switch SWA and the second power switch SWB based on the current limiting control signal CC to implement per-phase overcurrent protection. The control unit 102 may further include an enable under-voltage protection circuit EN UVLO that is configured receive an enable signal EN (through, for example, an enable input terminal), determine whether the enable signal EN is under-voltage, and provide a control unit enable signal 102_EN, a switching step-down module enable signal 103_EN1, a low dropout linear regulator module enable signal 104_EN respectively to the logic control circuit 1025, the switching step-down regulator module 103, and the low dropout linear regulator module 104. When the enable under-voltage protection circuit EN UVLO determines that the enable signal EN is under-voltage, the enable under-voltage protection circuit EN UVLO may be configured to disable the logic control circuit 1025, the switching step-down regulator module 103, and the low dropout linear regulator module 104 through the control unit enable signal 102_EN, the switching step-down module enable signal 103_EN1, and the low dropout linear regulator module enable signal 104_EN. When the enable under-voltage protection circuit EN UVLO determines that the enable signal EN is not under-voltage, the enable under-voltage protection circuit EN UVLO may be configured to enable the logic control circuit 1025, the switching step-down regulator module 103, and the low dropout linear regulator module 104 through the control unit enable signal 102_EN, the switching step-down module enable signal 103_EN1, and the low dropout linear regulator module enable signal 104_EN. The control unit 102 may further include an input under-voltage protection circuit VIN UVLO, an input over-voltage protection circuit VIN OVP, an output over-voltage protection circuit Output OVP, etc. Relevant descriptions are omitted here.

According to one embodiment of the present invention, the control unit 102 may further include an Inter-Integrated Circuit ("$I^2C$") storing and programming circuit 1029 that may be configured to allow users to program and set, through SDA, SCL, and ALT terminals, parameters such as a threshold Vth_INUV of the input under-voltage protection circuit VIN UVLO, a threshold Vth_INOV of the input over-voltage protection circuit VIN OVP, a threshold Vth_OUTOV of the output over-voltage protection circuit Output OVP, the steady-state reference signal Vref1 of the switching power converter 100 (for example, by setting a signal Ref1), a reference signal Vref2 that reflects the steady-state reference voltage value of the step-down output voltage VB (for example, by setting a signal Ref2), a current limiting threshold Ref_CC (for example, by setting a signal CCRef), etc. In one embodiment, the $I^2C$ storing and programming circuit 1029 may be further configured to enable or disable the switching step-down regulator module 103. For example, the $I^2C$ storing and programming circuit 1029 may be further configured to provide an enable signal 103_EN2 to the switching step-down regulator module 103 to enable or disable the switching step-down regulator module 103. In one application example, users may choose to couple other suitable voltage, e.g., the output voltage Vo of the switching power converter 100 or 200, to the step-down output terminal 103_O when the switching step-down regulator module 103 is disabled. Such application scenario is illustrated as a dashed-line path that connects to the step-down output terminal 103_O in FIGS. 1 and 2. In this scenario, the switching power converter 100 or the switching power converter 200 may not include the energy storage unit 107.

Figure 3:
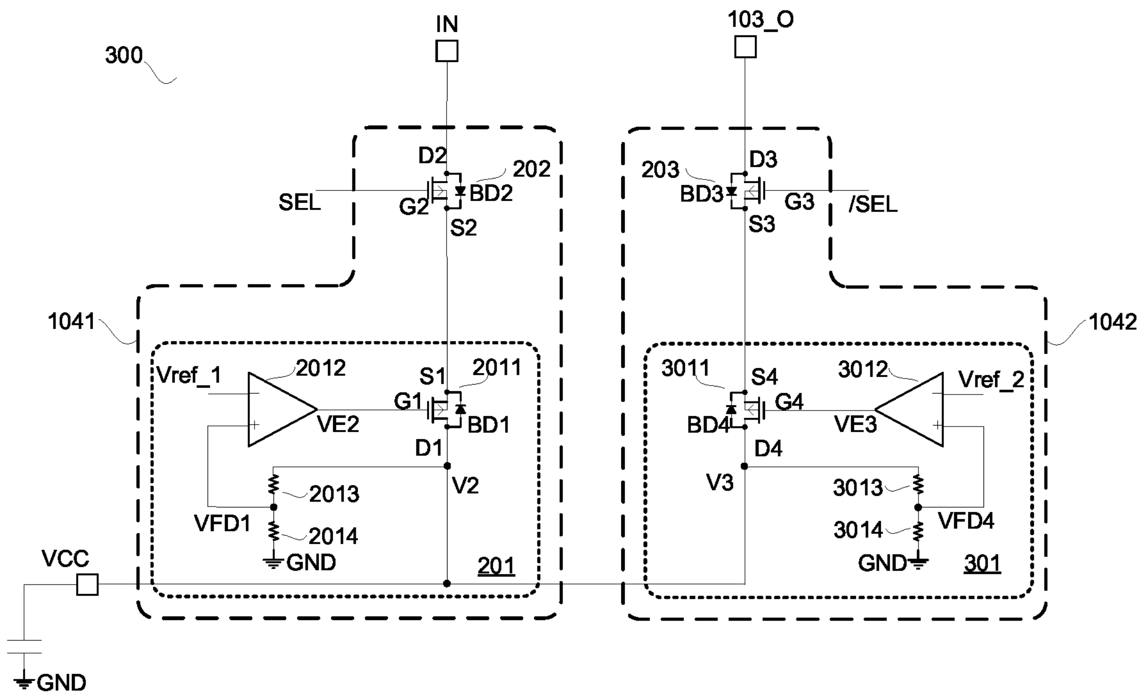
FIG. 3 is a circuit diagram of a low dropout linear regulator module 300 in accordance with an exemplary embodiment of the present invention.

FIG. 3 is a circuit diagram of a low dropout linear regulator module 300 in accordance with an exemplary embodiment of the present invention. The low dropout linear regulator module 300 may be used as the low dropout linear regulator module 104 illustrated in FIG. 1. The low dropout linear regulator module 300 may include a first low dropout linear regulator 201, a second low dropout linear regulator 301, a first controllable switch 202, and a second controllable switch 203. In this exemplary embodiment, the first controllable low dropout linear regulating path 1041 includes the first controllable switch 202 and the first low dropout linear regulator 201, and the second controllable low dropout linear regulating path 1042 includes the second controllable switch 203 and the second low dropout linear regulator 301.

The first low dropout linear regulator 201 may be configured to perform linear step-down regulation to a voltage at its first input terminal S1 based on a first reference voltage Vref_1 received by its second input terminal, to provide the second set voltage V2 at its output terminal D1. The first reference voltage Vref_1 may be a constant reference voltage value that is indicative of the second set voltage V2. It should be understood by persons skilled in the art that the first low dropout linear regulator 201 may be implemented by any low dropout linear regulating circuit known in the art. The present invention does not limit thereto. The example of FIG. 3 shows an exemplary circuit implementation of the first low dropout linear regulator 201 that may perform linear step-down regulation by regulating the first regulating transistor 2011 to operate in the linear region (i.e., the Ohmic region). In the example of FIG. 3, the first low dropout linear regulator 201 is illustrated as further including a second operational amplifier 2012 that is configured to perform operation to the first reference voltage Vref_1 and a sample voltage (or, feedback voltage) VFD1 that is indicative of a voltage at an output terminal D1 of the first low dropout linear regulator 201, to provide a second operational amplifying output signal VE2. In the example of FIG. 3, the voltage at the output terminal D1 of the first low dropout linear regulator 201 is sampled through resistors 2013 and 2014 that are coupled in series in order to provide the sample voltage VFD1. The second operational amplifying output signal VE2 is configured to be coupled to a control terminal G1 of the first regulating transistor 2011 to regulate the voltage at the output terminal D1 of the first low dropout linear regulator 201 to the second set voltage V2 by regulating the first regulating transistor 2011 to operate in the linear region (i.e., the Ohmic region).

In the example of FIG. 3, the first controllable switch 202 may be coupled between the power input terminal IN and the first input terminal S1 of the first low dropout linear regulator 201, and its control terminal G2 may be coupled to the linear regulating path control module 105 and be configured to receive, for example, the linear regulating path control signal SEL. The first controllable switch 202 may be configured to be turned on, for example, through the linear regulating path control signal SEL, when the step-down output voltage VB is lower than the set threshold voltage Vth (or when the sample voltage VFB2 is lower than the threshold reference voltage Vthref). Accordingly, there will be an electric conducting path from the power input terminal IN to the first low dropout linear regulator 201, the input signal (e.g., the input voltage Vin or the output voltage Vo) at the power input terminal IN may be transmitted to the first input terminal S1 of the first low dropout linear regulator 201, and the first low dropout linear regulator 201 performs linear step-down regulation to provide the second set voltage V2. In this example, the first controllable low dropout linear regulating path 1041 is considered to be enabled (or activated) at this time. The first controllable switch 202 may be further configured to be turned off through, for example, the linear regulating path control signal SEL when the step-down output voltage VB reaches the set threshold voltage Vth (or when the sample voltage VFB2 reaches the threshold reference voltage Vthref), so that the electric conducting path from the power input terminal IN to the first low dropout linear regulator 201 is cut off, and the input signal (e.g., the input voltage Vin or the output voltage Vo) at the power input terminal IN is stopped from being transmitted to the first low dropout linear regulator 201. In this example, the first controllable low dropout linear regulating path 1041 is considered to be disabled (or deactivated) at this time.

The second low dropout linear regulator 301 may be configured to perform linear step-down regulation to a voltage at its first input terminal S4 based on a second reference voltage Vref_2 received by its second input terminal, to provide a third set voltage V3 at its output terminal D4. The second reference voltage Vref_2 may be a constant reference voltage value that is indicative of the third set voltage V3. In one embodiment, the third set voltage V3 is larger than or equal to the second set voltage V2, and the second reference voltage Vref_2 is larger than or equal to the first reference voltage Vref_1. For example, in one embodiment, the second set voltage V2 may be set to be 3.3V, and the third set voltage V3 may be set to be 3.6V. It should be understood by persons skilled in the art that the embodiment is merely exemplary and for better understanding the present invention, and the present invention does not limit the exact values of the second set voltage V2 and the third set voltage V3. The second low dropout linear regulator 301 may be implemented by any low dropout linear regulating circuit known in the art. The present invention does not limit thereto. The example of FIG. 3 shows an exemplary circuit implementation of the second low dropout linear regulator 301 that may perform linear step-down regulation by regulating the second regulating transistor 3011 to operate in the linear region (i.e., the Ohmic region). In the example of FIG. 3, the second low dropout linear regulator 301 is illustrated as further including a third operational amplifier 3012 that is configured to perform operation to the second reference voltage Vref_2 and a sample voltage (or, feedback voltage) VFD4 that is indicative of a voltage at an output terminal D4 of the second low dropout linear regulator 301, to provide a third operational amplifying output signal VE3. In the example of FIG. 3, the voltage at the output terminal D4 of the second low dropout linear regulator 301 is sampled through resistors 3013 and 3014 that are coupled in series, to provide the sample voltage VFD4. The third operational amplifying output signal VE3 is configured to be coupled to a control terminal G4 of the second regulating transistor 3011, to regulate the voltage at the output terminal D4 of the second low dropout linear regulator 301 to the third set voltage V3 by regulating the second regulating transistor 3011 to operate in the linear region (the Ohmic region).

Still with reference to the example of FIG. 3, the second controllable switch 203 may be coupled between the step-down output terminal 103_O of the switching step-down regulator module 103 and the first input terminal S4 of the second low dropout linear regulator 301, and its control terminal G3 may be coupled to the linear regulating path control module 105 and be configured to receive, for example, the linear regulating path control signal SEL. In one example, the control terminal G3 of the second controllable switch 203 may be configured to receive the linear regulating path control signal SEL through an inverter, so that the control terminal G3 of the second controllable switch 203 can be understood as receiving an inverted signal/SEL of the linear regulating path control signal SEL. The second controllable switch 203 may be configured to be turned on through, for example, the linear regulating path control signal SEL, when the step-down output voltage VB reaches the set threshold voltage Vth (or when the sample voltage VFB2 reaches the threshold reference voltage Vthref). Accordingly, there will be an electric conducting path from the step-down output terminal 103_O to the second low dropout linear regulator 301, the step-down output signal VB at the step-down output terminal 103_O may be transmitted to the first input terminal S4 of the second low dropout linear regulator 301, and the second low dropout linear regulator 301 performs linear step-down regulation to provide the third set voltage V3. In this example, the second controllable low dropout linear regulating path 1042 is considered to be enabled (or activated) at this time. The second controllable switch 203 may be further configured to be turned off through, for example, the linear regulating path control signal SEL when the step-down output voltage VB is lower than the set threshold voltage Vth (or when the sample voltage VFB2 is lower than the threshold reference voltage Vthref), so that the electric conducting path from the step-down output terminal 103_O to the second low dropout linear regulator 301 is cut off, and the step-down output signal VB is stopped from being transmitted to the second low dropout linear regulator 301. In this example, the second controllable low dropout linear regulating path 1042 is considered to be disabled (or deactivated) at this time.

In one embodiment, each of the first regulating transistor 2011, the second regulating transistor 3011, the first controllable switch 202, and the second controllable switch 203 may include a controllable transistor. For example, as illustrated in the example of FIG. 3, each of the first regulating transistor 2011, the second regulating transistor 3011, the first controllable switch 202, and the second controllable switch 203 includes a p-channel MOSFET and a body diode BD1, BD4, BD2, and BD3 respectively. A source terminal and a drain terminal of the first regulating transistor 2011 are respectively coupled to the first input terminal S1 and the output terminal D1 of the first low dropout linear regulator 201. A source terminal S2 and a drain terminal D2 of the first controllable transistor 202 are respectively coupled to the first input terminal S1 of the first low dropout linear regulator 201 and the power input terminal IN. A source terminal and a drain terminal of the second regulating transistor 3011 are respectively coupled to the first input terminal S4 and the output terminal D4 of the second low dropout linear regulator 301. A source terminal S3 and a drain terminal D3 of the second controllable transistor 203 are respectively coupled to the first input terminal S4 of the second low dropout linear regulator 301 and the step-down output terminal 103_O. The body diode BD1 of the first regulating transistor 2011 and the body diode BD2 of the first controllable transistor 202 are connected in a back-to-back manner, which can prevent the current from flowing from the output terminal D1 (or, the linear regulating output terminal VCC) backwards to the power input terminal IN. The body diode BD4 of the second regulating transistor 3011 and the body diode BD3 of the second controllable transistor 203 are also connected in the back-to-back manner, which can prevent the current from flowing from the step-down output terminal 103_O backwards to the power input terminal IN, and prevent the current from flowing from the linear regulating output terminal VCC backwards to the step-down output terminal 103_O.

Figure 4:
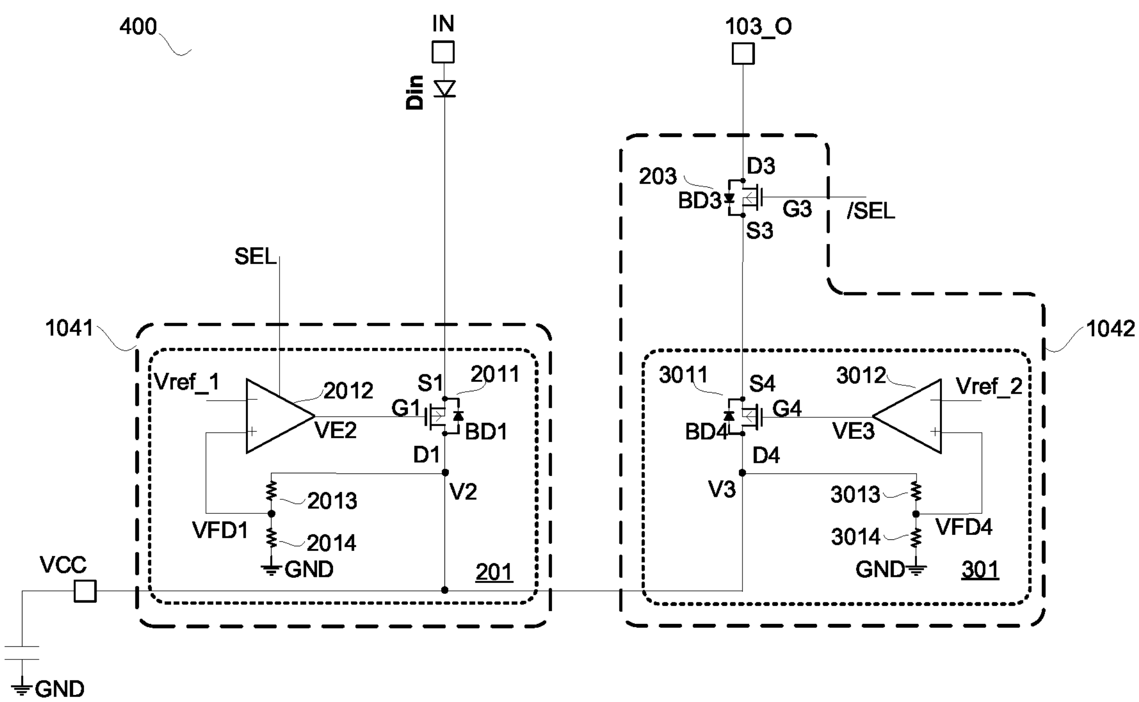
FIG. 4 is a circuit diagram of a low dropout linear regulator module 400 in accordance with another exemplary embodiment of the present invention.

FIG. 4 is a circuit diagram of a low dropout linear regulator module 400 in accordance with another exemplary embodiment of the present invention. The low dropout linear regulator module 400 may be used as the low dropout linear regulator module 104 illustrated in FIG. 1. The low dropout linear regulator module 400 may be considered as a modification based on the low dropout linear regulator module 300 discussed in the embodiment of FIG. 3. The differences between the low dropout linear regulator modules 400 and 300 are that the first controllable switch 202 is omitted in the low dropout linear regulator module 400, and that the linear regulating path control signal SEL may be configured to enable or disable the second operational amplifier 2012 and thus the first low dropout linear regulator 201. In this exemplary embodiment, the first controllable low dropout linear regulating path 1041 includes the first low dropout linear regulator 201, and the second controllable low dropout linear regulating path 1042 includes the second controllable switch 203 and the second low dropout linear regulator 301. In one example, as illustrated in FIG. 4, the power input terminal IN may be coupled to the low dropout linear regulator module 104 through the unidirectional conducting device Din.

In the example of FIG. 4, if the step-down output voltage VB is lower than the set threshold voltage Vth (or if the sample voltage VFB2 is lower than the threshold reference voltage Vthref), the second operational amplifier 2012 may be enabled through, for example, the linear regulating path control signal SEL, so that the first low dropout linear regulator 201 is enabled, performs linear step-down regulation to the input signal (e.g., the input voltage Vin or the output voltage Vo) received at the power input terminal IN, and then provides the second set voltage V2. In this example, the first controllable low dropout linear regulating path 1041 is considered to be enabled (or activated) at this time. If the step-down output voltage VB reaches the set threshold voltage Vth (or if the sample voltage VFB2 reaches the threshold reference voltage Vthref), the second operational amplifier 2012 may be disabled through, for example, the linear regulating path control signal SEL, so that the first low dropout linear regulator 201 is disabled, the input signal (e.g., the input voltage Vin or the output voltage Vo) received at the power input terminal IN is stopped from being transmitted to the first low dropout linear regulator 201. In this example, the first controllable low dropout linear regulating path 1041 is considered to be disabled (or deactivated) at this time. The operation and working principles of the second controllable low dropout linear regulating path 1042 is the same in the examples of FIGS. 3 and 4, and relevant descriptions are omitted here.

It should be understood by persons skilled in the art that several implementations of low dropout linear regulator modules are illustrated in FIGS. 3 and 4, and each of them can be used as the low dropout linear regulator module 104 illustrated in FIG. 1. Variant embodiments cannot be listed exhaustively here but should be considered within the scope of the present invention.

The advantages of the switching power converter (e.g., the switching power converter 100), the control circuit for the switching power converter (e.g., the control circuit (or, control chip) 106), and the voltage regulating unit for the switching power converter in accordance with various and variant embodiments of the present invention are not confined to those described above. These and other advantages of the various embodiments of the present invention will become more apparent upon reading the detailed descriptions and studying the various figures of the drawings.

The present invention provides a switching power converter (e.g., the switching power converter 100), a control circuit for a switching power converter (e.g., the control circuit (or, control chip) 106), and a voltage regulating unit for a switching power converter. While various embodiments have been described above, it will be understood that they have been presented by way of example only, and not limitation. Various modifications may be made without deviating from the spirit and scope of various embodiments of the present invention. Many of the elements of one embodiment may be combined with other embodiments in addition to or in lieu of the elements of the other embodiments. The scope of the present invention is defined by the following claims and includes combinations and sub-combinations of the various features described above, as well as variations and modifications thereof, which would occur to persons skilled in the art upon reading the foregoing description.

What is claimed is:

1. A control circuit for a switching power converter, comprising:

a power input terminal configured to receive an input signal;

a switching step-down regulator module having a step-down regulating input terminal and a step-down output terminal, wherein the step-down regulating input terminal is coupled to the power input terminal, and the switching step-down regulator module is configured to provide a step-down output voltage at the step-down output terminal; and a low dropout linear regulator module coupled to the power input terminal and the step-down output terminal, and configured to be powered by the power input terminal in a first operation period and be powered by the step-down output voltage in a second operation period.

2. The control circuit of claim 1, wherein a steady-state reference voltage of the step-down output voltage value is a first set voltage.

3. The control circuit of claim 2, wherein the low dropout linear regulator module is further configured to provide or generate a second set voltage at a linear regulating output terminal, and the second set voltage is lower than the first set voltage.

4. The control circuit of claim 1, wherein the switching power converter is configured to provide a first maximum output power, the switching step-down regulator module is configured to provide a second maximum output power, and the first maximum output power is larger than the second maximum output power.

5. The control circuit of claim 1, wherein the first operation period refers to a time period that the step-down output voltage of the switching step-down regulator module rises from a reference ground voltage to a set threshold voltage, and the second operation period refers to a time period that is after the first operation period.

6. The control circuit of claim 1, wherein the first operation period refers to a startup period of the switching power converter, and the second operation period refers to a time period after the first operation period.

7. The control circuit of claim 1, wherein the switching step-down regulator module comprises:

at least one step-down switch coupled between the step-down regulating input terminal and a reference ground; and a step-down switch control circuit configured to control the at least one step-down switch to be turned on or off.

8. The control circuit of claim 1, wherein the low dropout linear regulator module comprises:

a first controllable low dropout linear regulating path that forms between the power input terminal and a linear regulating output terminal, wherein the first controllable low dropout linear regulating path is configured to be enabled or disabled; and a second controllable low dropout linear regulating path that forms between the step-down output terminal and the linear regulating output terminal, wherein the second controllable low dropout linear regulating path is configured to be enabled or disabled.

9. The control circuit of claim 8, wherein the low dropout linear regulator module is further configured to enable the first controllable low dropout linear regulating path when the step-down output voltage is lower than the set threshold voltage, so that the low dropout linear regulator module draws power from the power input terminal through the first controllable low dropout linear regulating path.

10. The control circuit of claim 8, wherein the low dropout linear regulator module is further configured to enable the second controllable low dropout linear regulating path when the step-down output voltage reaches the set threshold voltage, so that the low dropout linear regulator module draws power from the step-down output terminal through the second controllable low dropout linear regulating path.

11. The control circuit of claim 1, further comprising:

a linear regulating path control module coupled to the step-down output terminal and the low dropout linear regulator module, configured to control or regulate a path from which the low dropout linear regulator module draws power, wherein the low dropout linear regulator module draws power from the power input terminal during the first operation period and draws power from the step-down output terminal during the second operation period.

12. The control circuit of claim 11, wherein:

the linear regulating path control module is further configured to compare the step-down output voltage and the set threshold voltage, or compare a sample voltage or a feedback voltage that is indicative of the step-down output voltage and a threshold reference voltage that is indicative of the set threshold voltage, and provide a linear regulating path control signal to control or regulate the path from which the low dropout linear regulator module draws power.

13. The control circuit of claim 8, wherein the first controllable low dropout linear regulating path comprises:

a first low dropout linear regulator configured to perform a linear step-down regulation to a voltage at a first input terminal of the first low dropout linear regulator based on a first reference voltage received by a second input terminal of the first low dropout linear regulator, in order to provide a second set voltage at an output terminal of the first low dropout linear regulator;

wherein if the step-down output voltage is lower than the set threshold voltage, the first low dropout linear regulator is enabled through a linear regulating path control signal;

if the step-down output voltage reaches the set threshold voltage, the first low dropout linear regulator is disabled through the linear regulating path control signal.

14. The control circuit of claim 1, wherein the switching step-down regulator module and the low dropout linear regulator module are integrated in a same chip.

15. A control circuit for a switching power converter, comprising:

a power input terminal configured to receive an input signal;

a switching step-down regulator module having a step-down regulating input terminal and a step-down output terminal, wherein the step-down regulating input terminal is coupled to the power input terminal, and the switching step-down regulator module is configured to provide a step-down output voltage at the step-down output terminal; and a low dropout linear regulator module coupled to the power input terminal and the step-down output terminal, and configured to draw power from the power input terminal when the step-down output voltage is lower than a set threshold voltage and draw power from the step-down output terminal when the step-down output voltage reaches the set threshold voltage.

16. The control circuit of claim 15, wherein a steady-state reference voltage value of the step-down output voltage is a first set voltage, the low dropout linear regulator module is further configured to provide or generate a second set voltage at a linear regulating output terminal, and the second set voltage is lower than the first set voltage.

17. The control circuit of claim 16, wherein the set threshold voltage is set to be higher than the second set voltage but not higher than the first set voltage.

18. The control circuit of claim 15, wherein the low dropout linear regulator module is further configured to provide or generate a second set voltage at a linear regulating output terminal, and the set threshold voltage is set to be higher than the second set voltage by a set voltage amplitude.

19. The control circuit of claim 15, wherein the switching step-down regulator module comprises:

at least one step-down switch coupled between the step-down regulating input terminal and a reference ground; and a step-down switch control circuit configured to control the at least one step-down switch to be turned on or off.

20. The control circuit of claim 15, wherein the low dropout linear regulator module comprises:

a first controllable low dropout linear regulating path that forms between the power input terminal and the linear regulating output terminal, wherein the first controllable low dropout linear regulating path is configured to be enabled or disabled; and a second controllable low dropout linear regulating path that forms between the step-down output terminal and the linear regulating output terminal, wherein the second controllable low dropout linear regulating path is configured to be enabled or disabled.

21. The control circuit of claim 20, wherein the low dropout linear regulator module is further configured to enable the first controllable low dropout linear regulating path when the step-down output voltage is lower than the set threshold voltage.

22. The control circuit of claim 20, wherein the low dropout linear regulator module is further configured to disable the second controllable low dropout linear regulating path when the step-down output voltage is lower than the set threshold voltage.

23. The control circuit of claim 20, wherein the low dropout linear regulator module is further configured to enable the second controllable low dropout linear regulating path when the step-down output voltage reaches the set threshold voltage.

24. The control circuit of claim 23, wherein the low dropout linear regulator module is further configured to disable the first controllable low dropout linear regulating path when the step-down output voltage reaches the set threshold voltage.

25. The control circuit of claim 15, further comprising:

a linear regulating path control module coupled to the step-down output terminal and the low dropout linear regulator module, configured to compare the step-down output voltage and the set threshold voltage, or compare a sample voltage or a feedback voltage that is indicative of the step-down output voltage and a threshold reference voltage that is indicative of the set threshold voltage, and provide a linear regulating path control signal to control or regulate a path from which the low dropout linear regulator module draws power.

26. The control circuit of claim 15, further comprising:

a control unit configured to turn on or off at least one power switch of the switching power converter, in order to adjust a power that is transmitted from the power input terminal to a power output terminal.

* * * * *